United States Patent Office 3,778,362
Patented Dec. 11, 1973

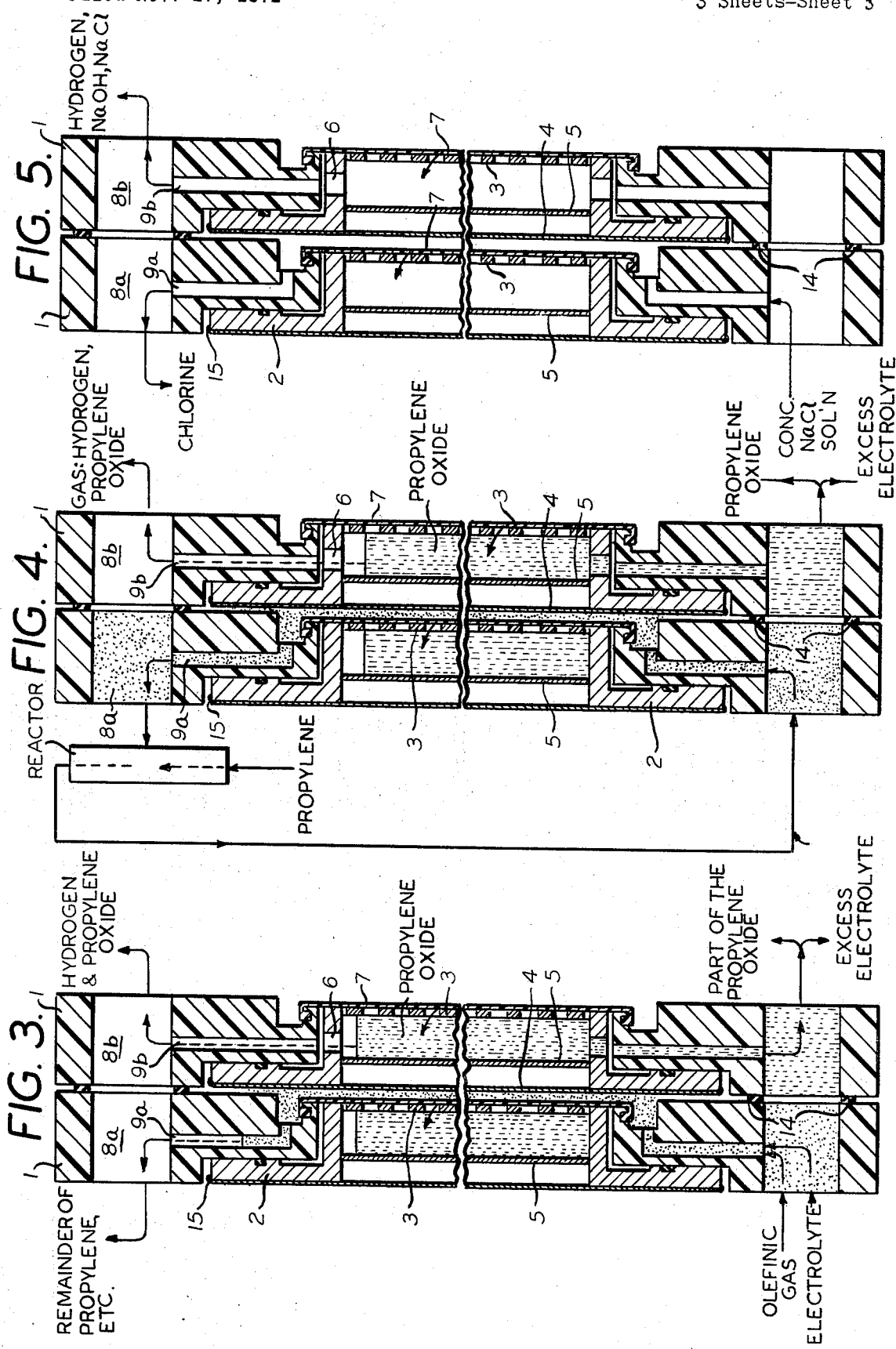

3,778,362
ELECTROLYTIC APPARATUS INCLUDING BIPOLAR ELECTRODES DEFINING AN ENCLOSED VOLUME AND HELD IN A NON-CONDUCTIVE FRAME
Herbert Wiechers, Opladen, and Reinhard Heikaus, Cologne-Stammheim, Germany, assignors to Bayer Aktiengesellschaft, Leverkusen, Germany
Continuation-in-part of abandoned application Ser. No. 739,470, June 24, 1968. This application Nov. 17, 1971, Ser. No. 199,776
Claims priority, application Germany, June 27, 1967, F 52,800
Int. Cl. B01k 3/04, 3/10
U.S. Cl. 204—254
10 Claims

ABSTRACT OF THE DISCLOSURE

Bipolar hollow plate electrode unit including an electrically conductive spacer body having a pair of opposed end face portions carrying respectively a cathode plate electrode and an anode plate electrode in transverse spaced relation to define thereby a hollow space between said electrodes, said plate electrodes being electrically interconnected through said spacer body at said end face portions, the spacer body in turn being carried in an electrically non-conductive spacer frame peripherally enclosing said spacer body and said plate electrodes, said frame having a corresponding pair of opposed end face portions and being of slightly greater transverse thickness than that of said body such that the corresponding end face portion of said frame adjacent the end face portion of said body carrying said cathode plate electrode extends slightly beyond said cathode plate electrode a given transverse distance, preferably with the cathode being a porous, e.g. wire gauze, plate electrode and with a separating wall disposed in the hollow space between the plate electrodes to define a catholyte space adajcent the cathode, e.g. with the porous cathode being covered with a diaphragm in contact with the surface thereof remote from the catholyte space, and preferably with the anode being in the form of an imperforate titanium plate containing a noble metal coating thereon on the side thereof remote from the cathode of the given bipolar electrode, e.g. with the opposite side of the anode having an electrically highly conductive metal coating thereon to enhance the electrical conductivity of the anode and peripherally being in contact with the corresponding spacer body end face portion adjacent thereto and preferably with such connection between the anode and the spacer body being in the form of an electrically highly conductive soldered joint; and electro-chemical cell arrangement for carrying out electrochemical reactions using an aqueous alkali metal halide solution as electrolyte, in the form of an aggregate of internally electrically interconnected cells made up of such bipolar units in side-by-side disposition with appropriate end electrodes and current terminal means to complete the system.

This application is a continuation-in-part of application Ser. No. 739,470, filed June 24, 1968, now abandoned.

This invention relates to an apparatus for electrochemical reactions.

We have devised an electrochemical cell which is particularly suitable for carrying out industrially electrochemical reactions using aqueous alkali metal halide solutions as electrolytes. This apparatus comprises a frame of an electrically non-conductive material and, inserted into the frame, a plate-like hollow body acting as a bipolar electrode one of whose end faces forms the anode and the other the cathode of the electrochemical cell, and whose interior simultaneously contains the cathode zone, in such a way that the surface of the cathode is set back relatively to the surface of the frame so that the anode zone is formed when this arrangement is joined together like a filter press.

Figure 1:
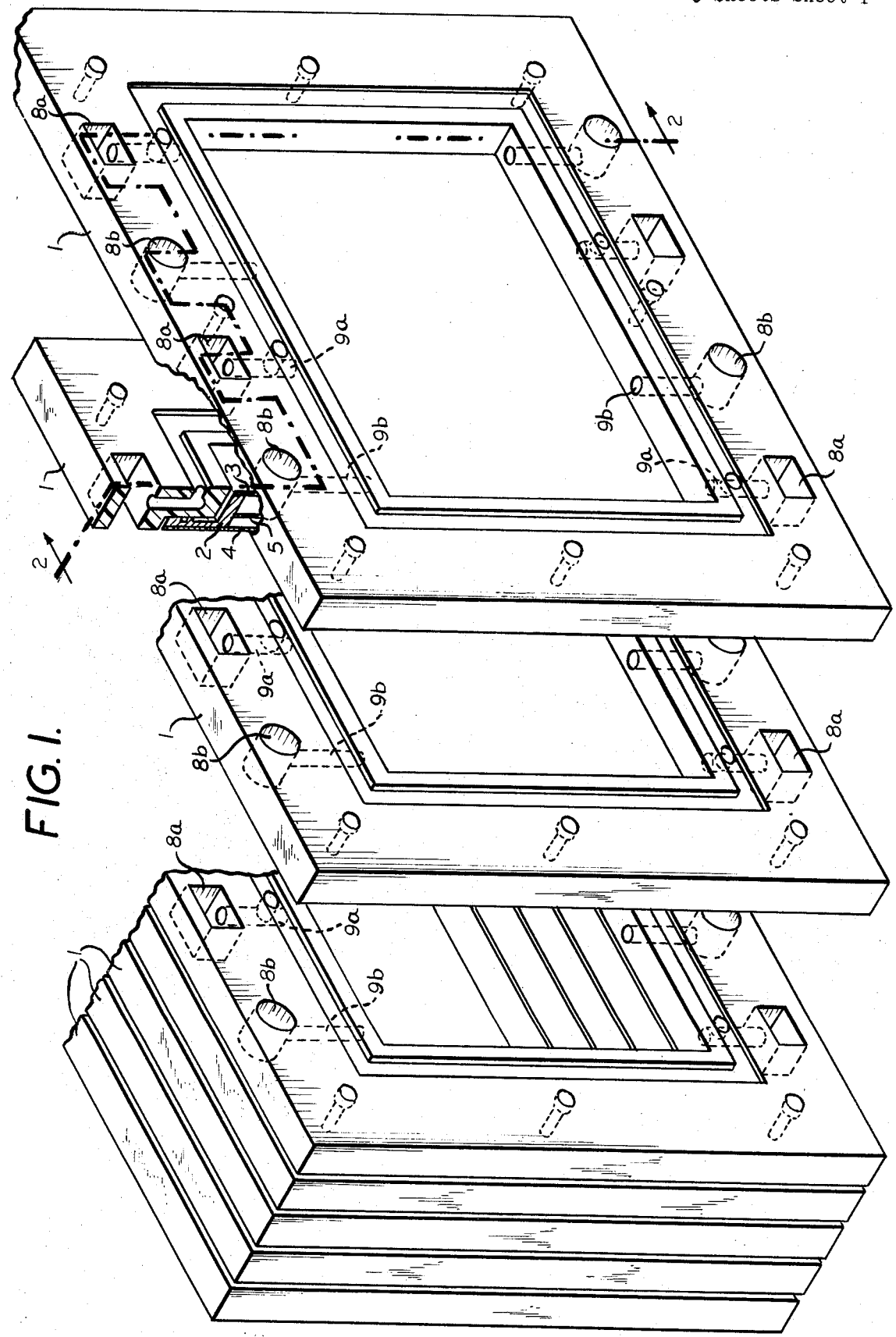
Figure 2:
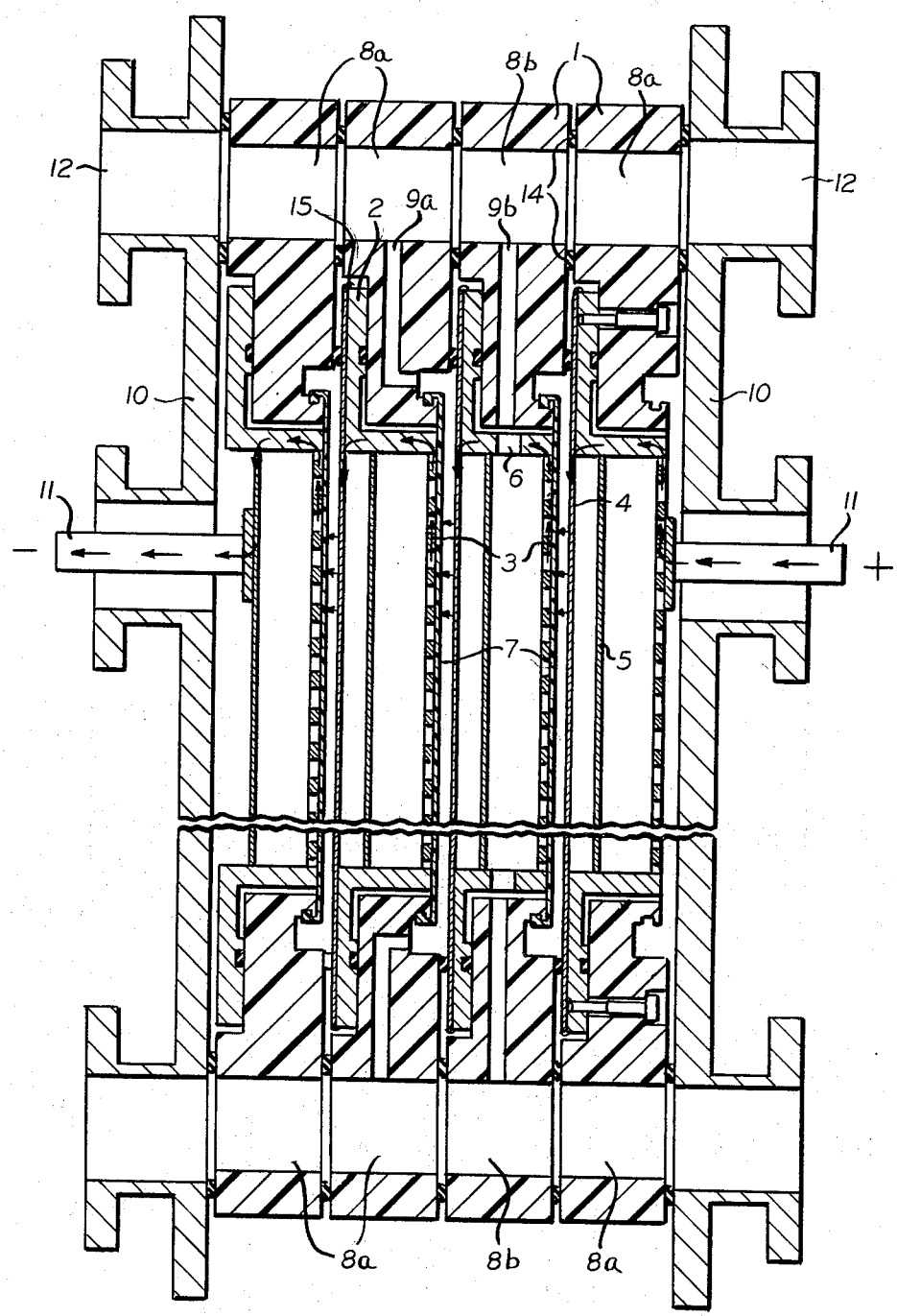

The new cell is described below with reference to the accompanying drawings, in which:

FIG. 1 is an exploded perspective view of a plurality of plates showing their construction and manner of assembly;

FIG. 2 is a vertical section through a cell assembly of just four of the plates of FIG. 1 showing their construction and the flow path of the electric current passing through the cell. The line 2—2 along which the section is taken is indicated in FIG. 1; and FIGS. 3, 4 and 5 are vertical sections, similar to FIG. 2, showing two plates and the flow paths of liquid and gases through the plates in different chemical reactions.

The cell in a bipolar arrangement comprises a frame of non-conductive material, for example a plastic material, 1, into which a plate-like hollow body 2 comprised of a material which is resistant to the catholyte is inserted and fixed. The frame 1 may be composed, for example, of an electrically non-conductive plastic material which is sufficiently resistant to the chemical influence of the electrolyte and which is mechanically strong enough to withstand the deforming forces exerted thereon by the compressive stresses which occur. The plastics materials used may be either unfilled or strengthened. Suitable plastics include, in particular, polyolefins such as polyethylene, polypropylene and polybutylene, and also thermosetting resins such as phenol/formaldehyde resins, in particular those reinforced with white, or preferably blue, silicate fibers. The creep rupture strength is advantageously at least $10^4$ h. at $50°$ C./20 kp./cm.$^2$. The plate-like hollow body 2 consists of a frame carrying the anode and cathode and is composed of a metal or alloy. Steels and alloyed steels, for example, may be used for the body 2.

The body 2 is designed with a profile such that it can be produced on a large scale by rolling. At one end, the body carries a cathode 3 which is in the form of a wire gauze or is otherwise perforated, whilst, at the other end of the body 2, a smooth unformed plate of titanium coated with a noble metal forms an anode 4. The cathode may be made of iron or alloyed steel. A thin sheet 5 advantageously made of the same material as the cathode, is inserted into the body 2 to separate the cathode zone towards the anode end, and, in conjunction with the body 2, forms a cathode chamber. Openings 6 in the body 2 provide gas and liquid inlets and outlets for the chamber. Whilst the cathode zone is thus formed by the metal body 2 itself, the anode zone is formed by joining the individual plastic frames 1 together. A diaphragm 7 which separates the two zones is held in grooves 13 in the plastics frame and is in direct contact with the cathode 3. Collecting channels 8 are provided in the plastic frames 1 for carrying electrolyte and gases into and out of the anode and cathode zones, the channels 8a and b being connected with the individual zones through bores 9a and b, respectively. The zones and collecting channels are sealed off from one another and from the outside by seals 14. An electrolyser can be assembled by joining together a variable number of cells, but not less than two. Since the size of the individual cell is also variable, the effective anode area of an electrolyzer may readily be varied within wide limits in order to obtain an economic and technical optimum. The individual cells are held together by means of end pressure plates 10 which also carry the terminals or connections for current feeds 11 and pipe sockets 12 for the collecting channels provided in the plastics frames. This arrangement simplifies very considerably the technical accessories required for the electrolyzer because the spatial arrangement and the number of connections are both independent of the number of individual cells.

The electric current flows from the connections in the end plate 11 through the metal frame from the outer periphery into the anode. Although, at first sight, this might not seem favorable so far as the uniform distribution of current over the surface of the anode and hence so far as the uniform passage of the current into the electrolyte are concerned, this is, nevertheless, an intentional part of the design, firstly, because it is possible in this way to obtain an extremely simple anode form consisting solely of one smooth uniformed plate, and, secondly, because the connection between the anode and the metal body is situated outside the electrolyte. Thus, in order to increase the conductivity of the anode plate, the anode may be coated on that side which is remote from the electrolyte (back) with an electrically highly conductive metal, for example, copper, silver and so on, and the connection to the body 2 may be provided, for example, by a soldered joint 15, thus ensuring the satisfactory passage of current between the body and the anode although at the same time the connection may readily be broken. The end product is thus a multi-layer anode in which the noble metal coating forms the electrochemically active surface, the titanium plate remains resistant to the corrosive effect of the electrolyte (anolyte) whilst the coating on the back provides for the smooth flow of current. It is possible in this way to minimize the thickness of the fairly expensive titanium plate.

The flow path of electric current is shown in FIG. 2, being through metallic conductors except for the narrow traverse, shown by small horizontal arrows, across the liquid electrolyte in the anode chamber defined between the anode of one plate and the cathode of the plate to its left.

The cell according to the invention is suitable for a whole number of electrochemical reactions carried out in aqueous alkali metal halide solutions, for example, the electrolysis of alkali metal chlorides or the reaction of olefins to form olefin oxides, for example, propylene to propylene oxide, ethylene to ethylene oxide or butenes to butene oxides.

Thus, in FIG. 3 there is shown the flow paths of reactant sand products when making propylene oxide. Olefinic gas containing propylene is admitted along with electrolyte at the bottom of the cell through channel 8a, flowing through bore 9a into the anode chamber defined between the cathode of the left plate and the anode of the right plate. The liquid flows through the cathodes to the left into the cathode chamber seen at the right the spent electrolyte containing some propylene oxide leaves at the bottom through bores 9b and channel 8b. The main product stream of propylene oxide gas and hydrogen is withdrawn at the top right along with a secondary stream, at the top left, comprising the balance of the propylene. The use of this apparatus is illustrated in Examples 1(a) and 1(b).

Example 1(c) is carried out using the cell of FIG. 4 which is identical with that of FIG. 3 except that the byproduct upper collector is connected to a reactor which is supplied with propylene. The reactor product is then recycled as feed. The legends illustrate the products and byproducts and their points of removal.

Example 2 is carried out in the apparatus shown in FIG. 5 with the flow paths there indicated.

The invention is illustrated by the following examples.

EXAMPLE 1

This demonstrates the use of the cell structure according to the invention for the electrochemical reaction of olefins to olefin oxides, in this case, propylene to propylene oxide.

(a) For this purpose, the cell shown in the drawing has been amplified to the extent that, at the lower widened end of the anode zone of each frame of the cell, there is a device, for example, a frit tube, which enables the olefinic gas which is to be reacted to be introduced into the particular anode zone in a finely divided state. The cell frame 1 consists of polyethylene, and the metal body 2 and the cathode 3, in the form of a wire gauze, consists of stainless steel. The titanium plate anode is provided on the side nearest to the electrolyte with a thin platinum/iridium layer and on its back with a thin layer of copper. A soldered joint provides for an electrically highly conductive connection between the anode and the stainless steel body. The diaphragm 7 which fits tightly over the cathode 3 consists of a polyacrylonitrile fabric.

The cell is filled with an 8.5% aqueous potassium chloride solution of which 200 liters per hour per m.$^2$ of anode surface are supplied through the corresponding collecting channels 8 and bores 9 into the anode zone and which are further passed from the anode zone through the diaphragm 7 into the cathode zone, being run off from the underneath of the cell through the corresponding openings 6 in the metal body 2 and the bores 9 by way of the corresponding collecting channels 8. The temperature of the electrolyte in the cell is 55° C.

The cell is operated at normal pressure. 1500 liters per hour per m.$^2$ of anode surface of a gas mixture containing 65% by volume of propylene and 35% by volume of an inert gas, mainly propane, are introduced through the aforementioned gas distributor.

By applying a D.C. voltage to the current feeds 11, an electric current is passed through the cell in such a way as to produce a current density of 20 amps/dm.$^2$. The voltage drop in each anode/cathode unit amounts to 4.1 volts. Approximately 85% of the propylene introduced is reacted on passing through the anode zone. The remainder leaves the anode zone in the form of a gas through the corresponding bores 9 and collecting channels 8 in the upper part of the cell. The propylene chlorohydrin formed passes through the diaphragm in solution in the electrolyte and then through the cathode, being dehydrohalogenated in the cathode zone into propylene oxide. The propylene oxide leaves the cell partly in solution in the electrolyte and partly in gaseous form together with the hydrogen formed at the cathode through the corresponding openings, bores and collecting channels. The gaseous and liquid reaction products leaving the cell in the anode gas, the cathode gas and the electrolyte were used to calculate the current yields set out in Table 1 below.

TABLE 1

| Reaction product: | Yield in current percent |
|---|---|
| Propylene oxide | 85.1 |
| 1,2-dichloropropane | 12.1 |
| Propylene glycol | 0.8 |
| Propylene chlorohydrin | 0.5 |
| Other compounds containing chlorine and oxygen | 0.6 |
| Oxygen | 0.5 |
| Carbon dioxide | 0.1 |

(b) As compared with the preparation of propylene oxide in Example 1(a) the frit tube in the anode zone is removed and the opening is used to introduce the common salt solution. Prior to electrolysis, the diaphragm is coated with asbestos, an asbestos fiber suspension being circulated by pumping while a weak vacuum is applied to the cathode side. A concentrated aqueous sodium chloride solution is introduced from below through channel 8 and bore 9 into the cell and, after electrolytic recovery of chlorine, transferred across the diaphragm 7 into the cathode zone. The resulting mixture of alkaline solution and common salt runs off at the top together with the hydrogen through the bores 9 and the collecting channels channel 8. The chlorine which has formed is drawn off through the corresponding channels in the anode zone. The current density at the anode surface is 20 amps./dm.$^2$ and the voltage drop across each plate is 3.8 volts. This special embodiment is favorable in that the amount of liquid which passes through the diaphragm can be varied by regulating the pressure differential of chlorine and hydrogen.

(c) The cell shown in FIG. 4 has a number of collecting channel 8 at the top and bottom of the cell frame. These collecting channels are connected with the anode and cathode zones through bores 9. The cell frame 1 consists of a phenol/formaldehyde resin filled with asbestos fibers, the metal body 2 and the cathode 3, in the form of a wire gauze, consist of stainless steel. The titanium plate anode is provided on its side facing the electrolyte with a thin layer of ruthenium and on its back with a thin layer of copper. A soldered joint provides for an electrically highly conductive connection between the anode and the stainless steel body 2. The diaphragm 7 which fits tightly over the cathode consists of a polypropylene fabric. The collecting channels arranged at the top and bottom of the cell frame, being connected with the anode zone through bores 9, communicate with a tower-like reactor through pipes.

The cell and reactor are filled with an 8.5% aqueous potassium chloride solution of which 200 liters per hour per m.$^2$ of anode area are supplied through the corresponding collecting channels 8 and bores 9 into the anode zone and which are further passed from the anode zone through the diaphragm 7 into the cathode zone, being run off from the lower end of the cell through the corresponding openings 6 in the metal body and the bores 9 by way of the corresponding collecting channels 8.

The temperature of the electrolyte in the cell is 60° C. The cell operates at normal pressure. 2000 liters per hour per m.$^2$ of anode surface of a gas mixture containing 57% by volume of propylene and 43% by volume of an inert gas, mainly propane, are introduced into the reactor through a device at the lower end of the reactor which enables the olefinic gas to be reacted to be finely divided. By applying a D.C. voltage to the current feeds 11, an electric current is passed through the cell in such a way as to produce a current density of 23 amps/dm.$^2$. The voltage drop in each anode/cathode unit amounts to 3.7 volts. Approximately 84% of the propylene introduced is reacted on passing through the reactor. The remainder leaves the reactor in gaseous form following separation from the electrolyte. Through the lift of the gas in the reactor, the electrolyte is kept circulating between the anode zone of the cell and the reactor through the aforementioned connecting pipes, precautions being taken to ensure that the circulating electrolyte leaves the reactor almost gas-free. The propylene chlorohydrin formed passes through the diaphragm and the cathode in solution in the electrolyte, being dehydrohalogenated into propylene oxide in the cathode zone. The propylene oxide leaves the cell through the corresponding openings, bores and collecting channels partly in solution in the electrolyte and partly in the from of a gas together with the hydrogen formed at the cathode. The gaseous and liquid reaction products leaving te cell and the reactor were analyzed and used to calculate the current yields set out in Table 2 below.

TABLE 2

| Reaction product: | Yield in current percent |
|---|---|
| Propylene oxide | 84.9 |
| 1,2-dichloropropane | 11.7 |
| Propylene glycol | 0.9 |
| Propylene chlorohydrin | 0.6 |
| Other compounds containing chlorine and oxygen | 0.9 |
| Oxygen | 0.8 |
| Carbon dioxide | 0.2 |

EXAMPLE 2

Sodium chloride electrolysis was carried out in a bipolar cell, as described in the figure, for the production of chlorine, hydrogen, and caustic soda solution. Both the contents of the anode as well as the cathode zones were recirculated at high speed by pumping. The electrolyte on either side was concentrated sodium chloride solution with 310 g. per litre of NaCl. The diaphragm was a simple PVC filter cloth. Using the pressure difference of the gases released during the electrolysis, chlorine and hydrogen, it was possible to precisely control the flow through the diaphragm; when the cell was loaded with 60 amperes, corresponding to a specific load of 3,000 amp/m.$^2$, it was approximately 50 mm. H$_2$O. After six hours of electrolysis, a solution, containing sodium chloride, with 41.2 g. per litre NaOH had formed on the cathode side. Taking into account the pre-load of common salt due to the filling of the anode zone with salt solution prior to the experiment, the ratio of common salt solution to caustic soda solution is Mole NaCl/mole NaOH=2.54 at a current efficiency greater than 90%, calculated on NaOH.

It will be appreciated that the instant specification and examples are set forth by way of illustration and not limitation, and that various modifications and changes may be made without departing from the spirit and scope of the present invention.

What is claimed is:

1. Bipolar hollow plate electrode unit which comprises an electrically conductive spacer body joining an anode plate electrode and a cathode plate electrode so as to define an enclosed volume, said spacer body having a pair of opposed end face portions carrying respectively said cathode plate electrode and said anode plate electrode in transverse spaced relation to define thereby a hollow space between said electrodes, said plate electrodes being electrically interconnected through said spacer body at said end face portions, said spacer body being in turn carried in an electrically non-conductive spacer frame peripherally enclosing said spacer body and said plate electrodes, said frame having a corresponding pair of opposed end free portions and being of greater transverse thickness than that of said body such that the corresponding end face portion of said frame adjacent the end face portion of said body carrying said cathode plate electrode extends beyond said cathode plate electrode a given transverse distance.

2. Unit according to claim 1 adapted to contain electrolyte therein wherein said cathode plate electrode is a porous plate electrode and a separating wall is disposed in the hollow space between said plate electrodes to define a catholyte space adjacent said cathode plate electrode, and wherein said spacer body, cathode plate electrode and separating wall are composed of metal material.

3. Unit according to claim 2 wherein flow communication means are defined through said frame and said body to communicate said catholyte space with the frame exterior and also defined through the end face portion of said frame adjacent the end face portion of said body carrying said cathode plate electrode to communicate the space adjacent the cathode plate electrode thereat with the frame exterior.

4. Unit according to claim 3 wherein said anode plate electrode is formed of a smooth unworked and imperforate titanium plate and contains a noble metal coating thereon on the surface thereof remote from said cathode plate electrode.

5. Unit according to claim 4 wherein a portion of the opposite surface of said anode plate electrode is in mechanical and electrical contact with the corresponding spacer body end face portion adjacent thereto and wherein the said opposite surface of said anode plate electrode contains an electrically highly conductive metal coating to enhance the conductivity of said anode plate electrode.

6. Unit according to claim 5 wherein said mechanical and electrical contact is in the form of an electrically highly conductive soldered joint.

7. Unit according to claim 3 wherein said cathode plate electrode is covered by a diaphragm in contact with the surface thereof remote from said catholyte space.

8. Unit according to claim 7 wherein at least two said spacer bodies are disposed in side-by-side spaced relation carried in corresponding frames which are in end face portion abutment with each other such that said spacer bodies are electrically insulated from each other and a corresponding anode plate electrode of one bipolar unit faces a corresponding cathode plate electrode of the next adjacent bipolar unit to define a series of cells in aggregate, with the given transverse distance by which a corresponding frame end face portion extends beyond the corresponding spacer body end face portion adjacent thereto defining a transverse anolyte space confined between the corresponding anode plate electrode of one bipolar unit and the cathode plate electrode of the next adjacent bipolar unit, the corresponding ends of the aggregate of cells being defined by corresponding end frames and end bodies carrying corresponding end anode and cathode plate counter-electrodes respectively to complete the end cells with the adjacent corresponding plate electrode of the bipolar unit thereat.

9. Unit according to claim 8 wherein current terminal means are provided correspondingly at said end bodies which are in internal electrically conductive contact with each other via the corresponding end electrodes, and in turn the individual cells of the aggregate and the spacer bodies of each bipolar unit which together comprise the internal portion of the series current conduction through the aggregate.

10. Electrochemical cell arrangement for carrying out electrochemical reactions using an aqueous alkali metal halide solution as electrolyte, which comprises an aggregate of internal electrically interconnected cells defined by a plurality of side-by-side bipolar hollow plate electrode units each including an electrically conductive spacer body joining an anode plate electrode and a cathode plate electrode so as to define an enclosed volume, said spacer body having a pair of opposed end face portions carrying respectively a cathode plate electrode and an anode plate electrode in transverse spaced relation to define thereby a hollow space between said electrodes, said plate electrodes being electrically interconnected through said spacer body at said end face portions, each said spacer body being in turn carried in an electrically non-conductive spacer frame peripherally enclosing said spacer body and said plate electrodes, said frame having a corresponding pair of opposed end face portions and being of greater transverse thickness than that of said body such that the corresponding end face portion of said frame adjacent the end face portion of said body carrying said cathode plate electrode extends beyond said cathode plate electrode a given transverse distance, such that the frames are in end face portion abutment with each other while the spacer bodies are transversely spaced from and thereby electrically insulated from each other due to the given transverse distance the appropriate frame end face portion extends beyond the corresponding spacer body end face portion and cathode plate electrode thereat, such that a corresponding anode plate electrode of one bipolar unit faces a corresponding cathode plate electrode of the next adjacent bipolar unit, and such that said given transverse distance by which a corresponding frame end face portion extends beyond the corresponding spacer body end face portion adjacent thereto defines a transverse anolyte space confined between the corresponding anode plate electrode of one bipolar unit and the cathode plate electrode of the next adjacent bipolar unit, the corresponding ends of the aggregate of cells being defined by corresponding end frames and end bodies carrying corresponding end anode and cathode plate counterelectrodes respectively to complete the end cells with the adjacent corresponding plate electrode of the bipolar unit thereat, and current terminal means being provided correspondingly at said end bodies which are in internal electrically conductive contact with each other via the corresponding end electrodes, and in turn the individual cells of the aggregate and the spacer bodies of each bipolar unit which together comprise the internal portion of the series current conduction through the aggregate.

References Cited

UNITED STATES PATENTS

| | | | |
|---|---|---|---|
| 3,316,167 | 4/1967 | Clarke, Jr. et al. | 204—268 |
| 3,451,914 | 6/1969 | Colman | 204—268 |
| 3,287,251 | 11/1966 | Horne et al. | 204—268 |
| 3,518,180 | 6/1970 | Grotleer | 204—268 |
| 1,535,185 | 4/1925 | Spencer | 204—256 |
| 2,682,505 | 6/1954 | Greco | 204—256 |

FOREIGN PATENTS

| | | | |
|---|---|---|---|
| 175,401 | 2/1922 | Great Britain | 204—256 |
| 1,078,129 | 8/1967 | Great Britain | 204—254 |

JOHN H. MACK, Primary Examiner

W. I. SOLOMON, Assistant Examiner

U.S. Cl. X.R.

204—256, 268, 286